(12) United States Patent
Cox et al.

(10) Patent No.: US 8,012,431 B2
(45) Date of Patent: *Sep. 6, 2011

(54) CLOSING BLADE FOR DEFORMABLE VALVE IN A MICROFLUIDIC DEVICE AND METHOD

(75) Inventors: David M. Cox, Foster City, CA (US); Zbigniew T. Bryning, Campbell, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 1227 days.

This patent is subject to a terminal disclaimer.

(21) Appl. No.: 11/598,480

(22) Filed: Nov. 13, 2006

(65) Prior Publication Data

US 2007/0059214 A1    Mar. 15, 2007

Related U.S. Application Data

(63) Continuation of application No. 10/403,652, filed on Mar. 31, 2003, now Pat. No. 7,135,147, which is a continuation-in-part of application No. 10/336,274, filed on Jan. 3, 2003, now Pat. No. 7,198,759, and a continuation-in-part of application No. 10/336,706, filed on Jan. 3, 2003, now Pat. No. 7,214,348.

(60) Provisional application No. 60/398,777, filed on Jul. 26, 2002, provisional application No. 60/398,851, filed on Jul. 26, 2002, provisional application No. 60/398,946, filed on Jul. 26, 2002.

(51) Int. Cl.
*B01L 3/00* (2006.01)

(52) U.S. Cl. ........ 422/503; 422/501; 422/502; 422/607; 436/180

(58) Field of Classification Search ............... 422/58, 422/63, 64.99, 100, 102, 103, 104, 501, 502, 422/503, 509, 600, 602, 607, 500; 436/180
See application file for complete search history.

(56) References Cited

U.S. PATENT DOCUMENTS

| | | | |
|---|---|---|---|
| 4,358,979 A | 11/1982 | Kurzbuch | |
| 4,851,371 A | 7/1989 | Fisher et al. | |
| 5,061,446 A | 10/1991 | Guigan | |
| 5,110,552 A | 5/1992 | Guigan | |
| 5,154,888 A | 10/1992 | Zander et al. | |
| 5,229,297 A | 7/1993 | Schnipelsky et al. | |
| 5,422,271 A | 6/1995 | Chen et al. | |

(Continued)

FOREIGN PATENT DOCUMENTS

JP    9-502249    3/1997

(Continued)

OTHER PUBLICATIONS

Japanese Office Action from corresponding Japanese Patent Application No. 2005-505604.

(Continued)

*Primary Examiner* — Jill Warden
*Assistant Examiner* — Dwayne K Handy (57) ABSTRACT

A microfluidic manipulation system is provided that includes a blade for manipulating deformable material and at least one movable support that is capable of moving the blade into contact with a microfluidic device including a deformable feature. When the microfluidic device is operatively held by a holder, a movable support can position the distal end of the blade relative to the microfluidic device and move the contact tip surface of the blade such that it deforms the deformable feature.

26 Claims, 8 Drawing Sheets

U.S. PATENT DOCUMENTS

| | | | |
|---|---|---|---|
| 5,460,780 A | 10/1995 | Devaney et al. | |
| 6,048,734 A | 4/2000 | Burns et al. | 436/180 |
| 6,068,751 A | 5/2000 | Neukermans | 204/601 |
| 6,102,897 A | 8/2000 | Lang | 604/246 |
| 6,302,134 B1 | 10/2001 | Kellogg et al. | 137/74 |
| 6,375,871 B1 | 4/2002 | Bentsen et al. | |
| 6,375,901 B1 | 4/2002 | Robotti et al. | 422/103 |
| 6,379,929 B1 | 4/2002 | Burns et al. | 435/91.2 |
| 6,390,791 B1 | 5/2002 | Maillefer et al. | 417/413.3 |
| 6,408,878 B2 | 6/2002 | Unger et al. | 137/597 |
| 6,431,212 B1 | 8/2002 | Hayenga et al. | 137/855 |
| 6,457,236 B1 | 10/2002 | White et al. | |
| 6,494,433 B2 | 12/2002 | Mastrangelo et al. | 251/11 |
| 6,565,728 B1 * | 5/2003 | Kozulic | 204/606 |
| 6,761,962 B2 | 7/2004 | Bentsen et al. | |
| 6,810,713 B2 | 11/2004 | Hahn et al. | |
| 6,814,935 B2 | 11/2004 | Harms et al. | |
| 7,135,147 B2 * | 11/2006 | Cox et al. | 422/100 |
| 2001/0029983 A1 | 10/2001 | Unger et al. | 137/597 |
| 2001/0033796 A1 | 10/2001 | Unger et al. | 417/53 |
| 2001/0054778 A1 | 12/2001 | Unger et al. | 264/239 |
| 2002/0029814 A1 | 3/2002 | Unger et al. | 137/824 |
| 2002/0043638 A1 | 4/2002 | Kao et al. | 251/129.06 |
| 2002/0048533 A1 | 4/2002 | Harms et al. | 422/99 |
| 2002/0054835 A1 | 5/2002 | Robotti et al. | 422/103 |
| 2002/0064885 A1 | 5/2002 | Bedingham et al. | 436/174 |
| 2002/0117517 A1 | 8/2002 | Unger et al. | 222/214 |
| 2002/0144738 A1 | 10/2002 | Unger et al. | 137/824 |
| 2002/0148992 A1 | 10/2002 | Hayenga et al. | 251/61.1 |
| 2002/0168278 A1 | 11/2002 | Jeon et al. | 417/559 |
| 2002/0195579 A1 | 12/2002 | Johnson | 251/11 |
| 2005/0031494 A1 | 2/2005 | Harms et al. | |

FOREIGN PATENT DOCUMENTS

| | | |
|---|---|---|
| JP | 2001-070784 | 3/2001 |
| WO | WO 97/21090 | 6/1997 |

OTHER PUBLICATIONS

International Search Report Mailed Jun. 7, 2004, for International Application No. PCT/US03/22553.

* cited by examiner

CLOSING BLADE FOR DEFORMABLE VALVE IN A MICROFLUIDIC DEVICE AND METHOD

CROSS REFERENCE TO RELATED APPLICATIONS

The present application is a continuation of pending U.S. patent application Ser. No. 10/403,652 filed Mar. 31, 2003, which is in turn a continuation-in-part of pending U.S. patent application Ser. No. 10/336,274 filed Jan. 3, 2003, and a Continuation-in-Part of pending U.S. patent application Ser. No. 10/336,706, filed Jan. 3, 2003, each of which Continuation-in-Part applications claims benefit from earlier filed U.S. Provisional Patent Applications Nos. 60/398,777, filed Jul. 26, 2002, 60/398,851 filed Jul. 26, 2002, and 60/398,946, filed Jul. 26, 2002. Cross-reference is also made to U.S. patent application Ser. No. 10/403,640 filed Mar. 31, 2003, which is incorporated herein in its entirety by reference.

FIELD

The present teachings relate to microfluidic assemblies, systems, and devices, and methods for using such assemblies, systems, and devices. More particularly, the present teachings relate to assemblies, systems, and devices, and methods that allow for the manipulation, processing, and otherwise alteration of micro-sized amounts of fluid and fluid samples.

BACKGROUND

Microfluidic devices are useful for manipulating micro-sized fluid samples. There continues to exist a need for reliable valving systems in microfluidic devices that enable controlled fluid flow through the microfluidic device. In particular, a need exists for devices and methods that achieve quick and relatively simple actuation of valves, to promote efficient processing of fluid samples through microfluidic devices.

SUMMARY

According to various embodiments, a blade is provided for manipulating deformable material in a microfluidic device. The blade can include a support end and an opposing distal end. The distal end can include an end blade portion including a first side and a second side that are angled with respect to each other at an angle of from between about 75° and about 110°. The first side and the second side can mutually converge and intersect a contact tip surface at respective rounded transition regions. The contact tip surface can possess a length and a width. The first side and the second side can be separated from one another at the distal end of the blade by the length of the contact tip surface. The rounded transition regions can each include a radius of curvature that is from about 70% to about 95% the length of the contact tip surface. A third side and a fourth side of the blade can be angled with respect to each other at an angle of from about 45° to about 75°. Each of the third side and the fourth side can intersect the contact tip surface and can be separated from one another at the distal end of the blade by the width of the contact tip surface.

According to various embodiments, a microfluidic manipulation system is provided including at least one movable blade and at least one movable support that can be capable of being moved in at least a first direction and a second direction. The at least one movable blade can include a body defined by a support end and an opposing distal end. The support end can be operatively connected to the at least one movable support. The system can include a microfluidic device including at least one feature defined by a deformable material formed therein. A holder can hold the microfluidic device. The distal end of the blade can include an end blade portion including at least a first side and a second side that can converge to and terminate at a contact tip surface. The at least one movable support can be adapted to position the distal end of the at least one blade relative to the microfluidic device when the microfluidic device is operatively held by the holder. The at least one movable support can be capable of moving the contact tip surface such that the contact tip surface contacts the microfluidic device to deform the deformable material and at least partially close the at least one feature.

According to various embodiments, the microfluidic manipulation system can include a plurality of blades and the at least one movable support can be adapted to position at least one of the plurality of blades relative to the microfluidic device when the microfluidic device is operatively held by the holder. The at least one movable support can be capable of moving the contact tip surface of the at least one of the plurality of blades such that at least one respective contact tip surface can contact the microfluidic device to deform the deformable material and at least partially close the at least one feature.

Methods are also provided for closing at least one feature formed in a microfluidic device. The methods can include moving the support of the microfluidic manipulation system to force the distal end of the blade into contact with the microfluidic device to deform deformable material forming at least one feature and to at least partially close the at least one feature.

According to various embodiments, the methods can include forcing the distal end of at least one of a plurality of blades into contact with a microfluidic device to deform a deformable material and to at least partially close at least one feature of the device. The method can include forcing the distal end of two or more of the plurality of blades into contact with the microfluidic device to deform the deformable material and at least partially close the at least one feature.

According to various embodiments, methods can be provided for closing a channel formed in a microfluidic device. The method can include providing a microfluidic device including at least one channel formed therein that is at least partially defined by a deformable material. At least one first blade can be provided including a body defined by a support end and an opposing distal end. The distal end can terminate at a contact tip surface. The distal end of the at least one first blade can be forced into contact with the microfluidic device to deform the deformable material and at least partially close the at least one channel.

These and other embodiments may be more fully understood with reference to the accompanying drawing figures and the descriptions thereof. Modifications that would be recognized by those skilled in the art are considered a part of the present teachings and within the scope of the appended claims.

DETAILED DESCRIPTION OF CERTAIN EMBODIMENTS

Figure 1:
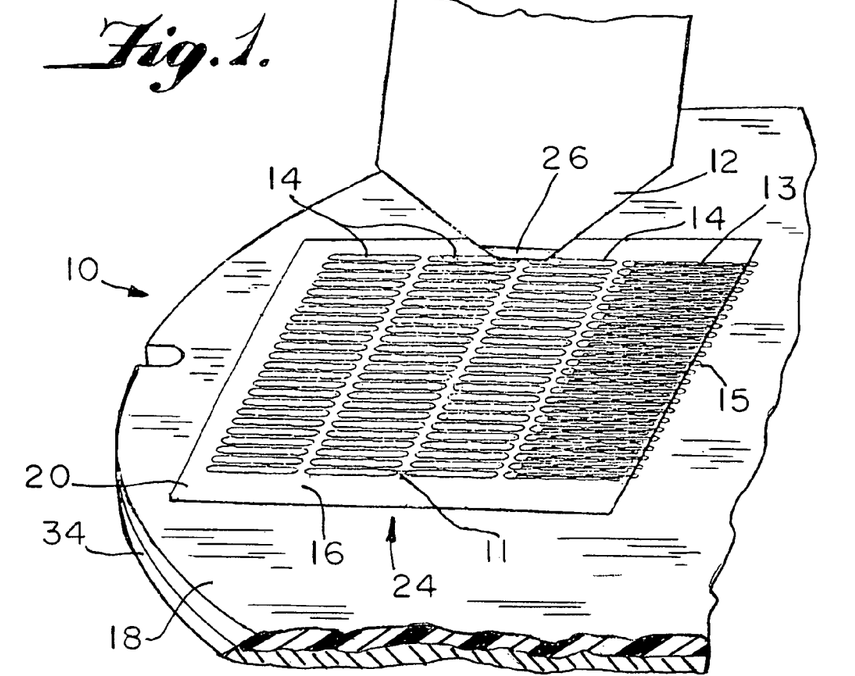
FIG. 1 is a perspective view of a system according to various embodiments that includes an opening blade shown in the process of deforming a microfluidic device.

FIG. 1 is a perspective view of a microfluidic manipulation system that can be used to manipulate micro-sized fluid samples. The system can include a microfluidic device 10 that includes a disk or substrate 18 and a pathway formed therein that is at least partially formed of a deformable material, for example, an inelastically deformable material. The substrate 18 of the microfluidic device 10 can include a plurality of sample wells 14 formed therein. The substrate 18 can be in the shape of a disk, or a rectangular or square card, or can have any other shape. The sample wells are exemplary of features that can be included in or on the microfluidic device 10. Other features that can be included in or on the microfluidic device 10 include reservoirs, recesses, channels, vias, appendices, output wells, purification columns, valves, and the like.

As shown in FIG. 1, the plurality of sample wells 14 can be arranged generally linearly in a series, with each series forming a sample processing pathway. At one end of each sample processing pathway, a sample well or input chamber 13 can be provided for the introduction of fluid samples. The input chamber 13 can include a U-shaped-cross-sectioned channel or reservoir that includes an input port 15 arranged at one end thereof. According to various embodiments, and as shown in FIG. 1, more than one series constituting a respective sample processing pathway can be arranged side-by-side in or on the substrate such that a plurality of samples can be simultaneously processed on a single microfluidic device 10. For example, 96 sample processing pathways can be arranged side-by-side to form a set of processing pathways on a microfluidic device 10. Moreover, two or more sets of 96 sample processing pathways, for example, can be arranged on a single microfluidic device 10.

As shown in FIG. 1, portions of the substrate 18 can form intermediate walls 16 that can interrupt fluid communication between adjacent sample wells 14 in a series or pathway, when the intermediate walls 16 are in a non-deformed state. The intermediate walls 16 can be forcibly deformed with an opening blade 12 to selectively achieve fluid communication 11 between two or more adjacent sample wells 14 of a sample processing pathway. By selectively arranging sample well 14 in respective series, micro-sized fluid samples can be sequentially processed through the respective sample processing pathways from one sample wells 14 to an adjacent sample well, and so on through the respective pathway. According to various embodiments, the opening blades can be made from a relatively rigid material. Stainless steel and hard aluminum can be used, for example, to form an opening blade.

Figure 2:
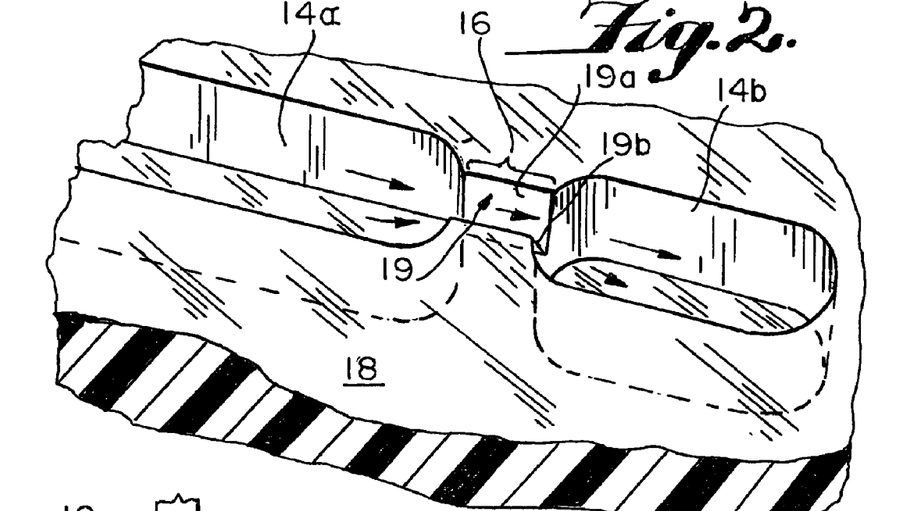
FIG. 2 is an enlarged view of the system shown in FIG. 1, and shows two sample wells forming part of a sample processing pathway and that are in fluid communication with each other through a connecting channel having a V-shaped cross-section.

FIG. 2 is an enlarged view of the microfluidic device 10 shown in FIG. 1, and illustrates a portion of a sample processing pathway that includes two sample wells 14a, 14b formed in the substrate 18. In a non-deformed state (not shown) of the substrate 18, fluid communication between the two sample wells 14a, 14b can be prevented, interrupted, or obstructed, by the intermediate wall 16 located between the sample wells 14a, 14b. The intermediate wall 16 can be at least partially formed from a deformable material, for example, an inelastically deformable material. According to various embodiments, the inelastically deformable material forming the intermediate wall 16 can be the same material used to form the substrate 18, and can be an integral part of the substrate 18. The inelastically deformable material forming the intermediate wall 16 can be selectively deformed by an opening blade tip, such that a depression or channel 19 can be formed that extends between the two sample wells 14a, 14b, to thereby create a fluid communication between the two sample wells 14a, 14b.

As shown in FIG. 1, the surface of the substrate 18 formed with sample wells 14 can be covered with an elastically deformable cover sheet 20. The cover sheet 20 can be made of, for example, a plastic, elastomeric, or other elastically deformable material. If included, the elastically deformable cover sheet 20 can be attached to the substrate 18 with an adhesive, for example, a layer of a pressure sensitive adhesive, a hot melt adhesive, or the like. Alternatively, the elastically deformable cover sheet 20 can be attached to the substrate 18 with another attachment mechanism, for example, a heat weld, clamps, screws, nails, by friction-fit, or the like. According to various embodiments, either one of, or both of, the elastically deformable cover sheet 20 and the adhesive, can be transparent and/or translucent. Alternatively, according to various embodiments, either one of or both of the elastically deformable cover sheet 20 and the adhesive can be opaque, non-transparent, and/or non-translucent.

Figure 19:
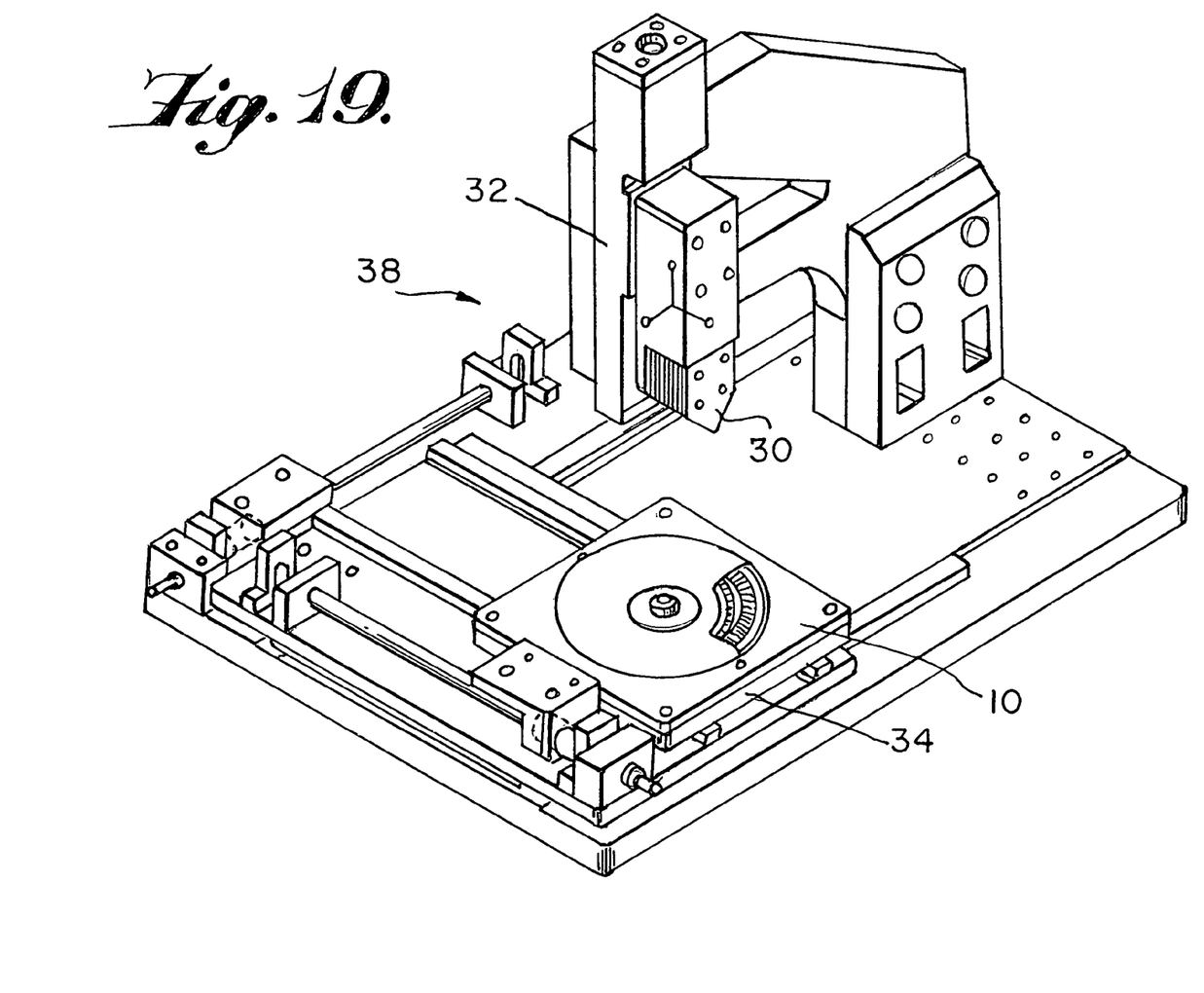
FIG. 19 is a perspective view of a microfluidic manipulation system according to various embodiments and including a stack of closing blades arranged on a moveable support, and a microfluidic card arranged on a holder.

According to various embodiments, the microfluidic device 10 can form a part of a microfluidic assembly or system 38, as shown in FIG. 19 as discussed below.

A system or assembly according to various embodiments can include a variety of deforming blades, for example, one or more opening blades and/or one or more closing blades. Such systems can be used in connection with microfluidic assemblies that can include at least one sample processing pathway, including at least two sample-containing features that can be placed in fluid communication with one another.

Referring to FIG. 1, when it is desired to transfer a fluid sample from one sample well 14 to another sample well 14, a movable support can force at least one opening blade 12 into contact with the elastically deformable cover 20 of the microfluidic device 10 in an area adjacent the intermediate wall 16. A blade tip portion 26 of the opening blade 12 can force the elastically deformable cover 20 into the deformable material of the intermediate wall 16. When forced into the intermediate wall 16 with a sufficient force, the blade tip portion 26 of the opening blade 12, with the elastically deformable cover 20 in between, can form a depression 19 in the intermediate wall 16, as shown in FIG. 2.

Figures 3, 7:
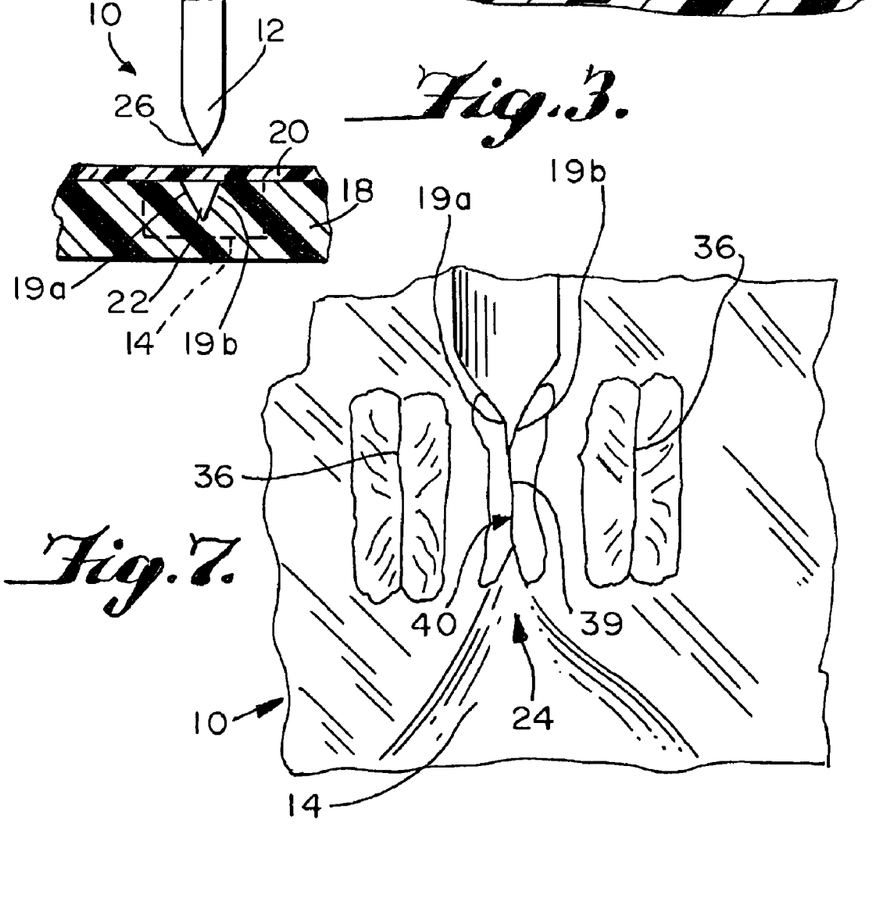
FIG. 3 is a side view of a system including an opening blade that has been retracted after deforming a portion of a microfluidic device.
FIG. 7 is a top view of a deformed microfluidic device according to various embodiments including a previously open deformable valve that has been closed by two closing blades that formed adjacent depressions in the microfluidic device.

FIG. 3 is an end view of an opening blade 12 according to various embodiments and illustrates the opening blade 12 after contacting and forming a depression 19 in a microfluidic device 10. Upon fully retracting the opening blade 12, the elastically deformable cover 20 rebounds at least partially back toward its initial substantially planar orientation, while the deformable material of the substrate 18, if less elastic than the cover 20, remains deformed. As a result, a channel 22 is formed, defined by the cover 20 and the depression 19, and extending between the sample wells 14. As shown in FIGS. 2 and 3, the depression 19 can be defined by a sidewall including a first sidewall portion 19a and a second sidewall portion 19b.

FIG. 2 illustrates a close-up, perspective view of the depression 19 formed in the substrate 18 by an opening blade 12. According to various embodiments, the depression 19, and, in turn, the sidewalls 19a and 19b thereof, can exhibit a variety of cross-sectional shapes depending upon the blade tip design of the opening blade 12. For example, an opening blade design including a straight edge, a chisel-edge, or a pointed-blade design, can be used to form the depression 19 in the disk portion 18. According to various embodiments, the shape of the blade tip portion 26 of the opening blade 12, and the force applied to the microfluidic device 10 by the opening blade 12 are designed to prevent the opening blade 12 from cutting or ripping through the cover 20.

Accordingly, a deformable portion of a microfluidic device 10 can be deformed by an opening blade 12 to establish fluid communication between sample wells 14. The deformable portions can be parts of a deformable valve of the type described in U.S. patent application Ser. No. 10/398,851 filed Jul. 26, 2002, which is incorporated herein in its entirety by reference, and which are referred to herein as Zbig valves.

Various structural properties and characteristics of the components of the microfluidic assembly, for example, the substrate 18 material, the cover 20 material, and the adhesive component can be as disclosed in U.S. Provisional Application No. 60/398,851.

The substrate 18 of the microfluidic device 10 can include a single layer of material, a coated layer of material, a multi-layered material, and combinations thereof. More particularly, the substrate 18 can be formed as a single-layer and made of a non-brittle plastic material, such as polycarbonate, or a TOPAZ material, a plastic cyclic olefin copolymer material available from Ticona (Celanese AG), Summit, N.J., USA.

The elastically deformable cover 20 can possess elastic properties that enable it to be temporarily deformed when contacted by a deforming blade. However, in contrast to the more inelastically deformable material of the substrate 18, the elastically deformable cover layer 20 can more or less return to an original orientation to an extent sufficient to achieve fluid communication between underlying sample wells 14. PCR tape materials can be used as, or with, the elastically deformable cover 20. Polyolefinic films, other polymeric films, copolymeric films, and combinations thereof can be used, for example, to form the elastically deformable cover layer 20.

According to various embodiments, the materials forming the components of the microfluidic device can be capable of withstanding thermal cycling at temperatures of from about 60° C. to about 95° C., as, for example, the microfluidic device 10 would be exposed to if the device is used to perform polymerase chain reactions (PCR). Furthermore, the materials forming the components of the microfluidic device 10 can possess a strength such that the microfluidic device 10 can withstand forces that are applied when forcing fluid samples therethrough. For example, the materials forming the components of the microfluidic device 10 can withstand centrifugal forces encountered when spinning the microfluidic device 10 and sequentially forcing samples from one sample well 14 to another by centripetal motion.

According to various embodiments, after opening a Zbig valve 24 by way of an opening blade 12, a fluid sample held in an initial sample well can be forced to move through the resultant channel 22 and into an adjacent sample well. The fluid sample can be forced to move by way of centripetal or gravitational force, for example. The microfluidic device 10 can be attached to a rotatable platen and spun, whereby centripetal force causes a fluid sample to move through the open channel 22 from a radially inwardly arranged sample well to a radially outwardly arranged sample well.

Figure 4:
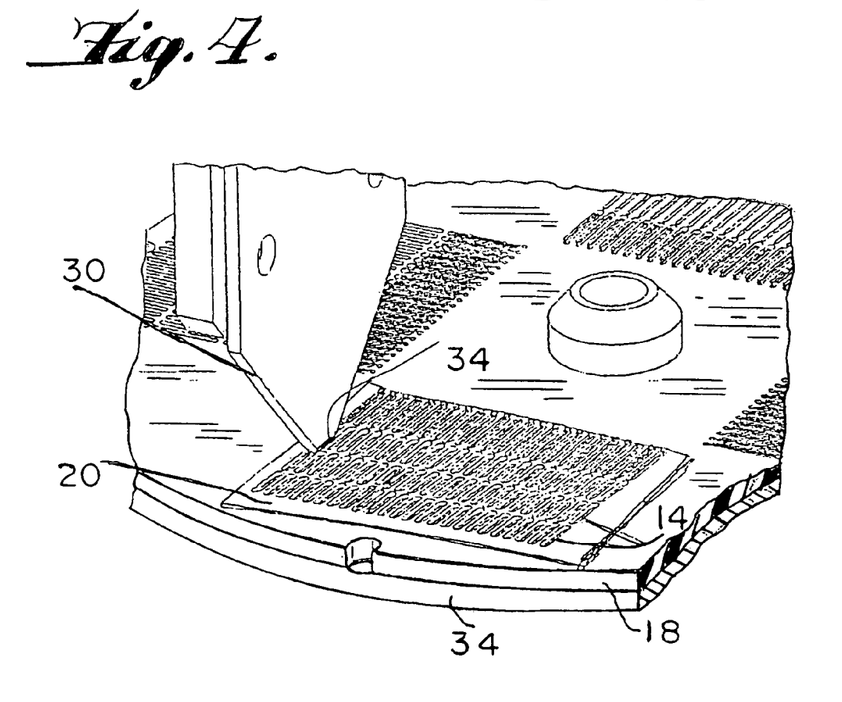
FIG. 4 is a perspective view of a system according to various embodiments and including a closing blade in the process of deforming a microfluidic device.

According to various embodiments, to continue processing the fluid sample in the radially outwardly arranged sample well, for example, to perform a polymerase chain reaction (PCR), it can be desirable to close the Zbig valve 24 to prevent fluid sample from migrating back into the radially inward sample well. According to various embodiments and as shown in FIG. 4, a closing blade 30 can be provided to plastically deform or cold-form the deformable material forming the channel 22 of the open Zbig valve 24. In particular, a closing blade 30 can be used alone, or in combination with one or more additional closing blades, to quickly and simply form a barrier wall or dam of deformable material between the sample wells 14. The barrier wall can at least partially prevent fluid communication between sample wells 14, thereby reducing the possibility of the fluid sample undesirably migrating back into the sample well in which the fluid sample was previously held in.

According to various embodiments, the deformable material of the substrate 18 can be struck on either side, both sides, or within or across the width of the area of the channel 22 portion of the open Zbig valve 24. One or more closing blades 30 can be used to strike the microfluidic device 10 in either a sequential or simultaneous manner, or in a combination thereof.

Figure 5:
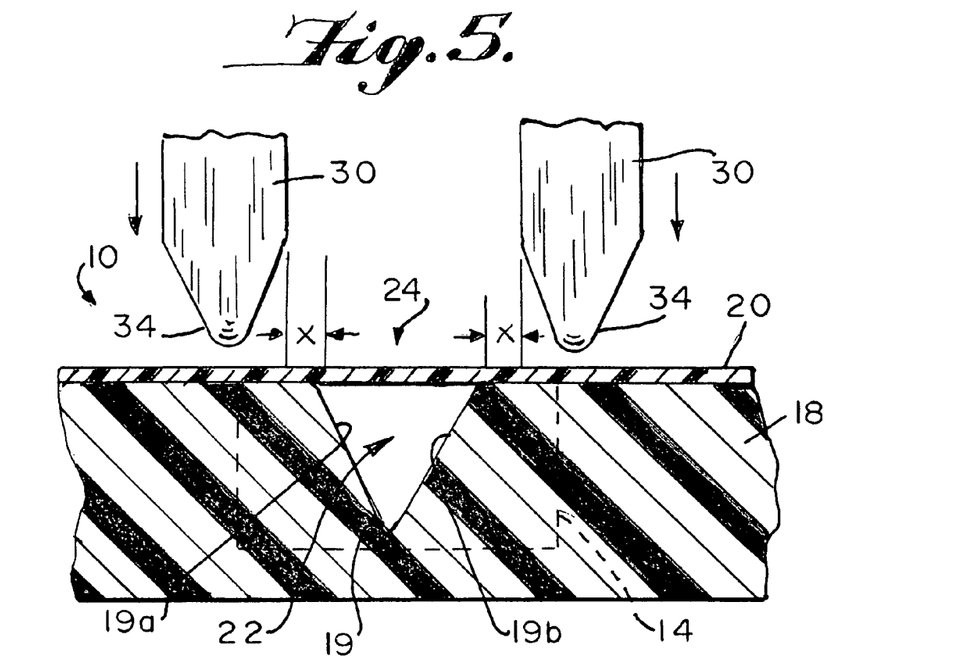
FIGS. 5 and 6 are sequential side views of a system according to various embodiments and including two closing blades before deforming (FIG. 5) and after deforming (FIG. 6) a microfluidic device.
Figure 6:
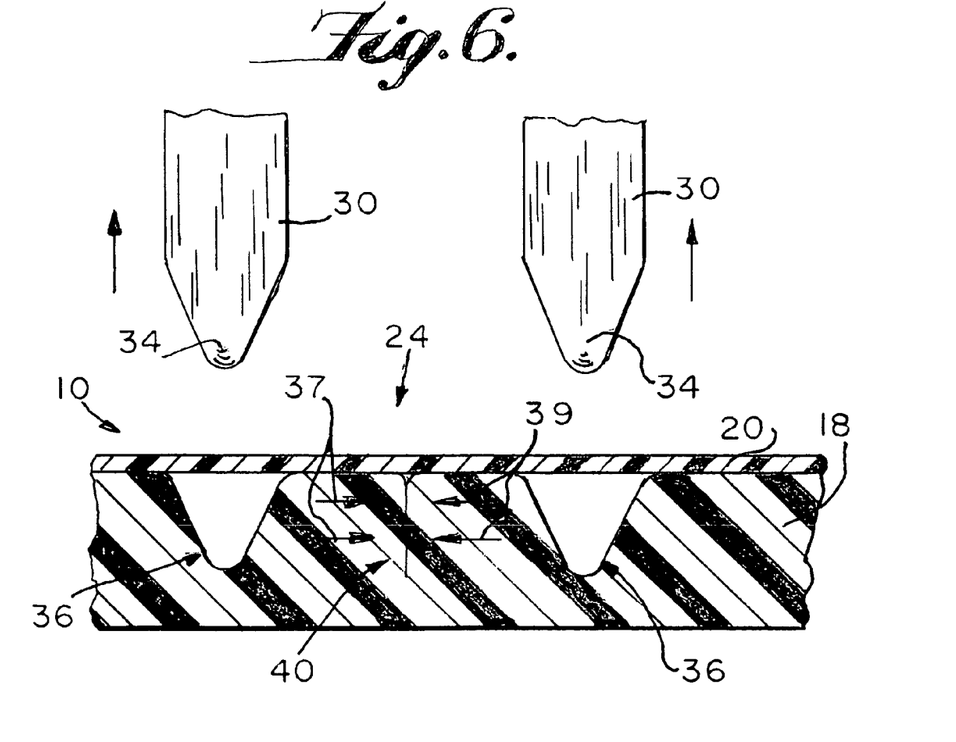

For example, FIGS. 5 and 6 sequentially illustrate a side view of an arrangement including two closing blades 30 deforming a microfluidic device 10. At least the blade tip portions 34 of the closing blades 30 can be forced into contact with the microfluidic card 10 in or near the open channel 22 of the Zbig valve 24 to at least partially close the channel 22.

According to various embodiments, the closing blade 30 can contact deformable material that was not previously deformed during a channel formation step. For example, as shown in FIG. 5, a closing blade 30 can strike the microfluidic device 10 a set distance, X, from a sidewall 19a, 19b of a channel 22. The distance, X, can correspond to at least about 0.75 mm from either sidewall 19a, 19b, for example. According to various embodiments, the distance, X, can vary proportionally as a finction of the size of the sample wells and the size of the depression 19 formed in the intermediate wall.

As sequentially shown in FIGS. 5 and 6, the one or more blade tip portions 34 of the respective one or more closing blades 30 can displace the deformable material of the substrate 18 when used to form impressions 36 in the substrate 18. By creating impressions 36 in relatively close proximity to the sidewalls 19a, 19b of the depression 19, material defining the sidewalls of the depression 19 can be deformed, for example, bulged inwardly, as shown by the arrows arranged in pairs at 37 and 39. As a result, a barrier wall 40 can be formed between two sample wells 14. Depending upon, for example, the number of blades used and the shape of the blade tip portions 34, the bulging deformation of the sidewalls 19a, 19b can be varied to either fully or partially close fluid communication between two adjacent sample wells 14.

According to various embodiments, by forming the impressions 36, and in turn forming the barrier wall 40, the deformable material forming the barrier wall 40 can be forced to achieve a fluid-tight seal between the cover 20 and the barrier wall 40, thus interrupting fluid communication between the adjacent sample wells 14. The deformable material forming the barrier wall 40 can be forced into contact with a pressure sensitive adhesive layer that is arranged between the cover 20 and the substrate 18.

FIG. 7 is a top view of a microfluidic device 10 that includes a previously open Zbig valve 24 that has been closed by way of deformations caused by two closing blades that straddle the valve 24. Two impressions 36, each formed by a respective closing blade 30 striking the microfluidic device 10, are illustrated. An impression 36 can be formed on either side or both sides of the channel of the previously open Zbig valve 24, and each impression 36 can be spaced a set distance from a sidewall 19a, 19b of the depression 19, as discussed above. The formation of the impressions 36 causes the sidewalls 19a, 19b of the Zbig valve channel to be pushed closed thereby deformably creating the barrier wall 40 and collapsing the sidewalls into contact with one another. The hot dog bun-shaped deformation in FIG. 7 illustrates the Zbig valve channel in a closed condition. More particularly, the sidewalls 19a, 19b are shown in contact with each other at 39.

With the Zbig valve 24 closed and fluid communication between the sample wells interrupted, it is possible to continue processing a fluid sample situated in the radially outwardly sample well without having the fluid sample migrate back into a previously occupied radially inward sample well.

FIGS. 8 to 17 illustrate several closing blade designs according to various embodiments. A blade tip portion 34 of a closing blade 30 can be provided with a closing blade designed to provide desired deformation to a deformable material, such as the material of a microfluidic device substrate. For example, the blade tip portion 34 can possess a shape that leaves an impression in a deformable material that causes features, such as the sidewalls of a channel, to deform and form a barrier wall between two previously joined sample wells. According to various embodiments, the closing blades can be made from a relatively rigid material. Stainless steel and hard aluminum can be used, for example, to form a closing blade.

Figure 8:
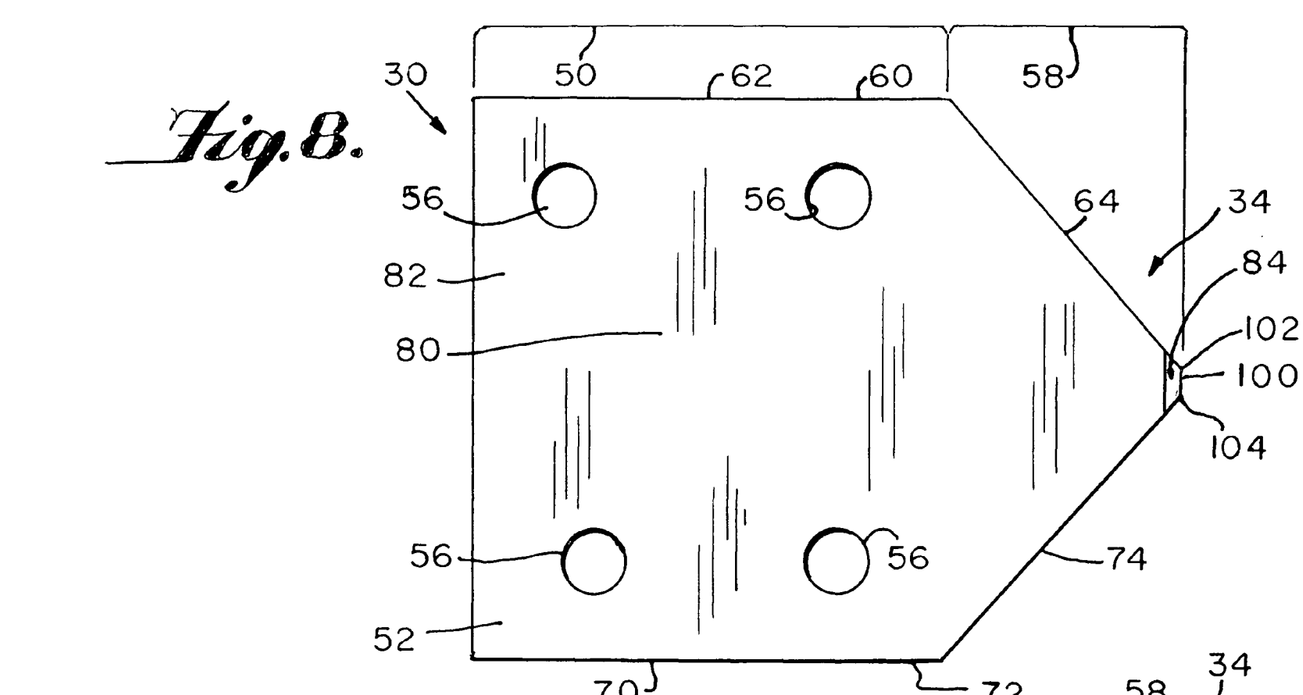
FIG. 8 is a top view of a closing blade design according to various embodiments.

FIG. 8 is a side view of a closing blade according to various embodiments. The closing blade 30 can include at least four side surfaces; a first side surface 60, a second side surface 70, a third side surface 80, and a fourth side surface 90 (not shown in FIG. 8). Each side includes a length extending from a support end 50 of the closing blade 30 to a distal end 58 of the closing blade 30.

The support end 50 of the closing blade 30 can include a main body portion 52. The main body portion 52 can include a connection mechanism for connecting the closing blade 30 to a moveable support. The moveable support can be, for example, an actuator for moving the closing blade 30 into and out of deformable contact with a microfluidic device 10. Such a moveable support 32 is shown in FIG. 19. The connection mechanism of the closing blade 30 can be a feature that allows the closing blade 30 to be securely fastened to the moveable support, such as one or more apertures 56 for threading or passing connecting bolts therethrough.

Figure 9:
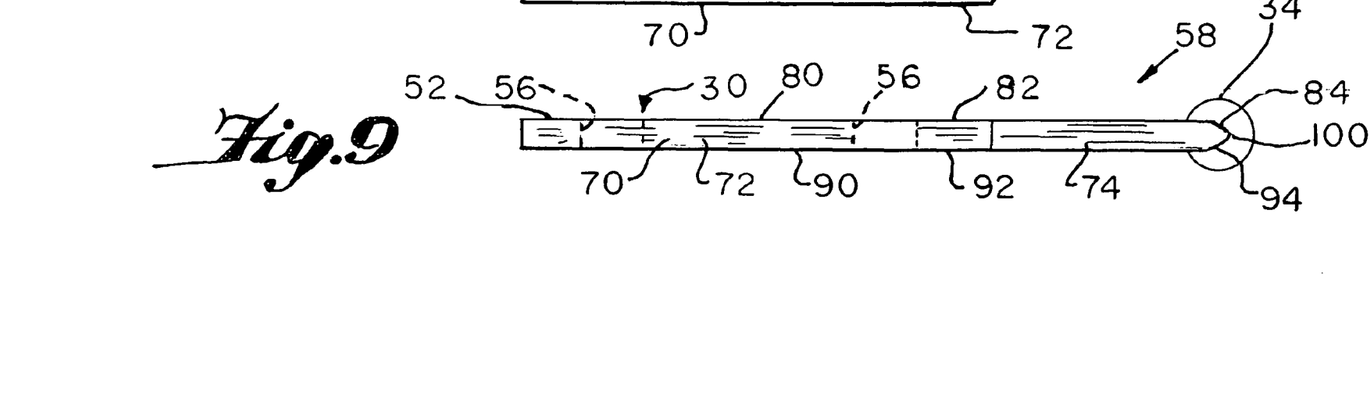
FIG. 9 is a side edge view of the closing blade shown in FIG. 8.

As shown in FIGS. 8 and 9, each of the first side surface 60, second side surface 70, third side surface 80, and fourth side surface 90, includes a first portion and a respective second angled portion that is angled relative to the first portion. For example; first side surface 60 includes first portion 62 and respective angled portion 64; second side surface 70 includes first portion 72 and respective angled portion 74; third side surface 80 includes first portion 82 and respective angled portion 84; and fourth side surface 90 includes first portion 92 and respective angled portion 94.

According to various embodiments, first side surface 60 and second side surface 70 can oppose one another and can include respective first portions 62, 72, that possess lengths that are longer, shorter, or the same, as the lengths of respective first portions 82, 92 of the third side surface 80 and the fourth side surface 90. Moreover, third side surface 80 and fourth side surface 90 can oppose one another, or alternatively, respective first portions 82, 92 of the third side surface 80 and fourth side surface 90, respectively, can oppose each other.

The first portions 62, 72 of the respective first and second side surfaces 60, 70 can extend parallel to one another, as illustrated in FIG. 8. The first portion 62 of the first side surface 60 can include a length that differs from the length of the first portion 72 of the second side surface 70. Correspondingly, the first portions 82, 92 of the respective third and fourth side surfaces 80, 90 can be parallel to one another, as illustrated in FIG. 9 that shows a side view of the closing blade of FIG. 8. The first portion 82 of the third side surface 80 can have a length that differs from the length of the first portion 92 of the fourth side surface 92.

As shown in FIG. 8, the distal end 58 of the closing blade 30 can include a blade tip portion 34. Along the blade tip portion 34, a first side angled portion 64 and a second side angled portion 74 are angled with respect to one another such that they mutually converge and intersect at a contact tip surface 100, at respective rounded transition regions 102, 104. Accordingly, each of the first side surface 60 and the second side surface 70 can terminate at the distal end 58 of the closing blade 30 at a respective rounded transition region 102, 104. The first side angled portion 64 and the second side angled portion 74 can be angled with respect to each other at an angle of from about 75° to about 110°, or from about 85° to about 95°, or from about 87° to about 93°.

FIG. 9 is a side view of the closing blade 30 shown along a length of the blade. As shown, first portion 82 of third side surface 80 and first portion 92 of the fourth side surface 90 are shown opposing one another. Moreover, at the distal end 58 of the closing blade 30, third side angled portion 84 and fourth side angled portion 94 can be angled with respect to one another such that they mutually converge and intersect at a contact tip surface 100. The third side angled portion 84 and the fourth side angled portion 94 can be angled with respect to each other at an angle of from about 45° to about 75°, or from about 50° to about 70°, or from about 55° to about 65°.

Figures 10, 11, 12:
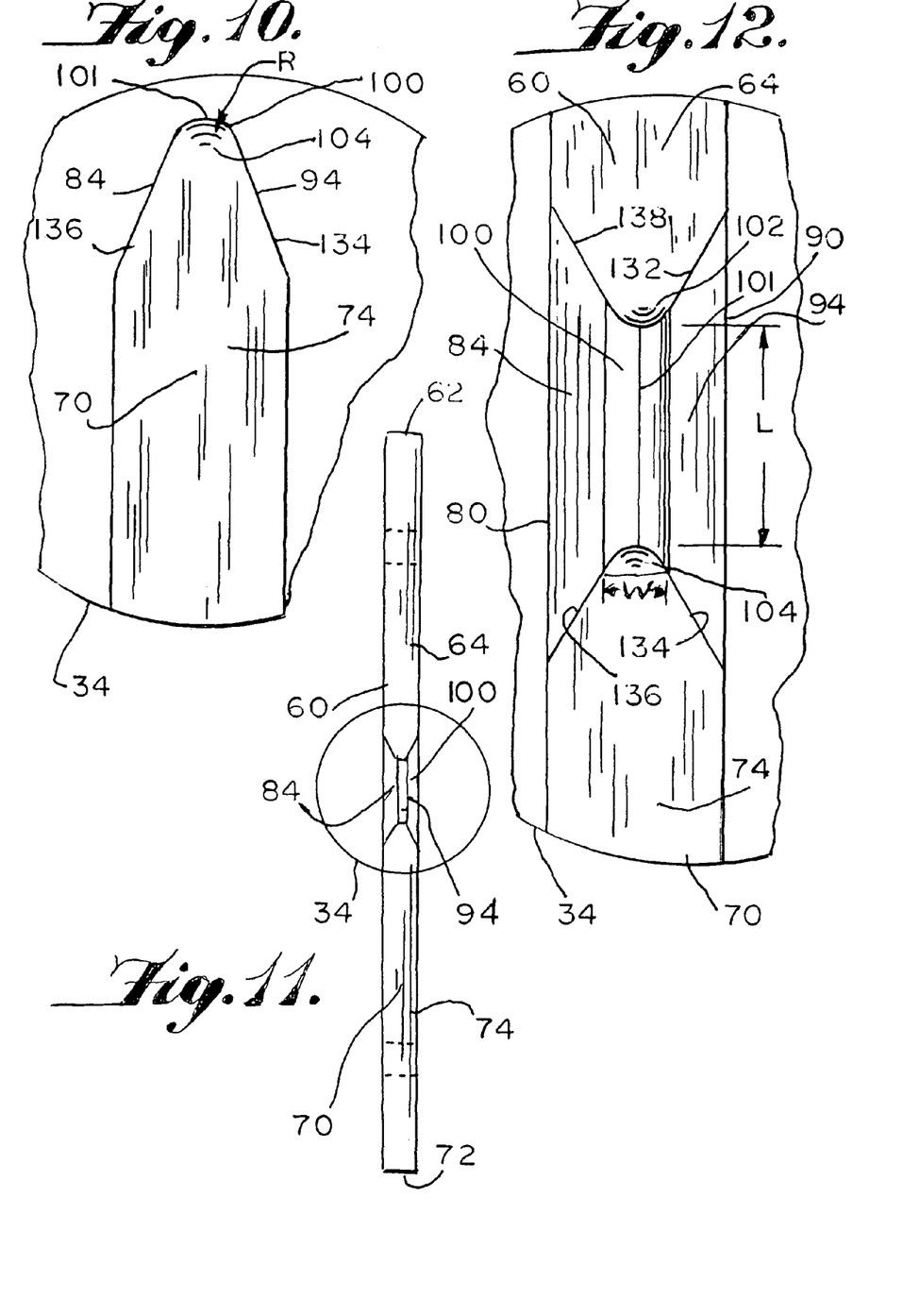
FIG. 10 is an enlarged side edge view of the blade tip end portion of the closing blade shown in FIG. 9.
FIG. 11 is an end view of the closing blade shown in FIG. 8.
FIG. 12 is an enlarged view of the blade tip end portion of the closing blade shown in FIG. 11.

FIG. 10 is an enlarged view of the blade tip portion 34 of the closing blade 30 shown in FIG. 9. The contact tip surface 100, formed at the converging ends of third side angled portion 84 and fourth side angled portion 94, can include a curved surface that can be defined by a radius of curvature, R. The radius of curvature, R, of the contact tip surface 100 can be a value of from about 0.0025 inch to about 0.0125 inch, a value of from about 0.0050 inch to about 0.0100 inch, or a value of about 0.0075 inch. The contact tip surface 100 can include an apex 101 at the distal tip thereof, and the apex 101 can provide a linear contact surface along a length of the contact tip surface 100.

FIG. 11 is an end view of the distal end 58 of the closing blade 30 of FIG. 8. The contact tip surface 100 is shown as being formed at and defined by the ends of the two pairs of mutually converging side angled portions. Specifically, the contact tip surface 100 can be formed at the end of the mutually converging first side angled portion 64 and second side angled portion 74, and at the end of the mutually converging third side angled portion 84 and fourth side angled portion 94.

FIG. 12 is an enlarged view of the blade tip portion 34 of the closing blade 30 shown in FIG. 11. As shown in FIG. 12, the contact tip surface 100 can possess a length, L, and a width, W. The length, L, can extend between an end of the first side angled portion 64, and an end of third side angled portion 74. Moreover, the width, W, can extend between an end of third side angled portion 84, and an end of fourth side angled portion 94. Ridges 132, 134, 136, and 138 can be formed at respective intersections of adjacent angled portions, for example, at the intersection of first side angled portion 64 and fourth side angled portion 94, or at the intersection of fourth side angled portion 94 and the second side angled portion 74.

FIG. 12 illustrates the first side angled portion 64 and second side angled portion 74 intersecting the contact tip surface 100 at respective rounded transition regions 102, 104. According to various embodiments, the rounded transition regions 102, 104 can each possess a radius of curvature that is from about 70% to about 95%, or from about 75% to about 90%, or from about 80% to about 85%, the length, L, of the contact tip surface 100. The radius of curvature of each of the rounded transition regions 102, 104 can be a value of from about 0.025 inch to about 0.075 inch, a value from about 0.035 inch to about 0.065 inch, or a value of about 0.050 inch.

Figure 13:
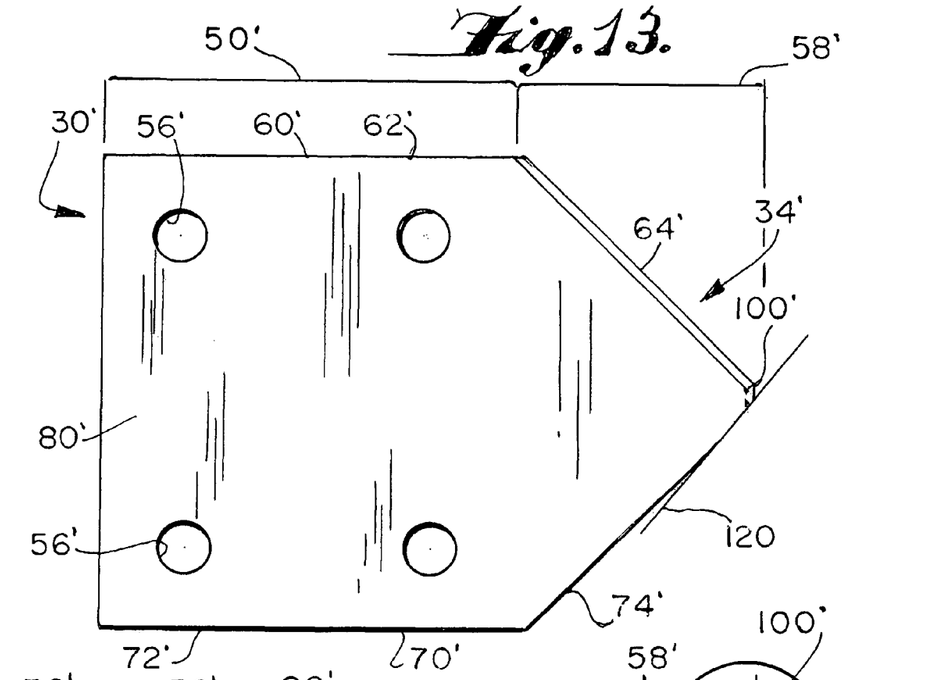
FIG. 13 is a top view of a closing blade design according to various embodiments.
Figure 14:
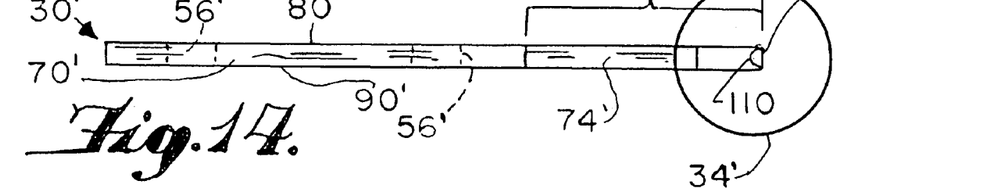
FIG. 14 is a side edge view of the closing blade shown in FIG. 13.

FIGS. 13-17 illustrate various views of a closing blade 30' with a modified closing blade design according to various embodiments. Features of the closing blade 30' that are similar to those of closing blade 30, bear the same numeral but are succeeded by a prime "'" symbol. For example, as shown in FIGS. 13 and 14 and similar to closing blade 30, closing blade 30' can include at least four side surfaces; a first side surface 60', a second side surface 70', a third side surface 80', and a fourth side surface 90'. Each side can possess a length that extends from a support end 50' of the closing blade 30' to a distal end 58' of the closing blade 30'. Similar to closing blade 30, the support end 50' of the closing blade 30' can include a main body portion 52' including a connection mechanism for connecting the closing blade 30' to a moveable support, such as moveable support 32 as shown.

As shown in FIG. 13, each of the first side surface 60' and the second side surface 70', can include a respective first angled portion and a respective second angled portion that can be angled relative to the first portion. For example, first side surface 60' can include first portion 62' and a respective angled portion 64', and second side surface 70' can include first portion 72' and a respective angled portion 74'. FIG. 14 shows that third side surface 80' and fourth side surface 90' can each extend to a contact tip surface 100' located at the distal end 58' of the closing blade 30'. According to various embodiments, each of the sides of closing blade 30' can exhibit the characteristics, such as lengths, widths, angles, for example, as disclosed for the comparable characteristics of closing blade 30, as previously disclosed above.

As shown in FIG. 13, first side angled portion 64' and second side angled portion 74' can be angled with respect to one another such that they mutually converge and intersect the contact tip surface 100'. The first side angled portion 64' and the second side angled portion 74' can be angled with respect to each other at an angle of from about 75° to about 110°, or from about 85° to about 95°, or from about 87° to about 93°.

FIG. 14 is a side view of the closing blade 30' along a length of the blade. As shown, third side surface 80' and fourth side surface 90' are shown in an opposing relationship to one another, and can be arranged to be parallel to one another. At the distal end 58' of closing blade 30', the third side surface 80' and the fourth side surface 90' terminate at the contact tip surface 100'. As shown in FIGS. 13 and 14, second side angled portion 74' can be cut along a plane 120 such that the plane 120 can cut through a portion of the recess 110 formed in the contact tip surface 100'. Alternatively, second side angled portion 74' can be arranged to be a substantially straight, flat sided surface that is angled to cut through a portion of the recess 110 of the contact tip surface 100'. As a result, the recess 110 can be at least partially open at a side of the contact tip surface 100', as shown in FIGS. 14 and 15.

Figure 15:
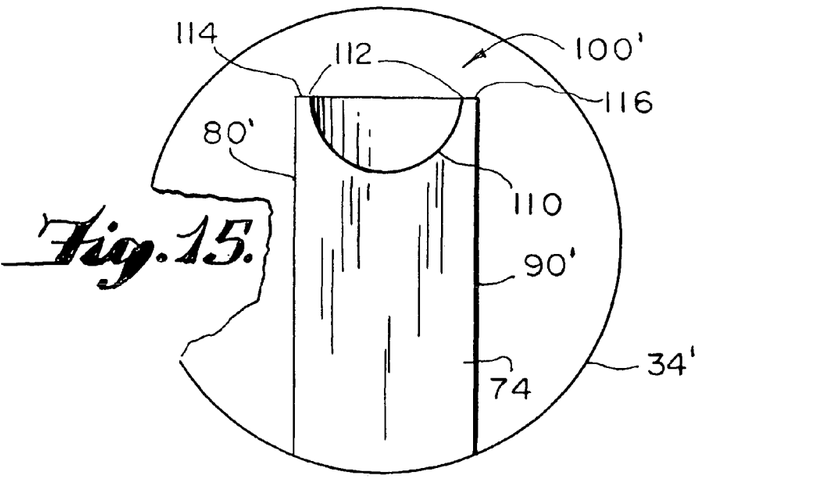
FIG. 15 is an enlarged view of the blade tip end portion of the closing blade shown in FIG. 14 and taken along line 34' in FIG. 14.

FIG. 15 is an enlarged side view of the blade tip portion 34' of closing blade 30' shown in FIG. 14. Contact tip surface 100' can include a rim 112 including an inner periphery partially defined by a recess 110. The rim 112 can include a substantially flat surface and can be at least partially defined by two spaced-apart contact tip surface portions 114, 116.

Figures 16, 17, 18:
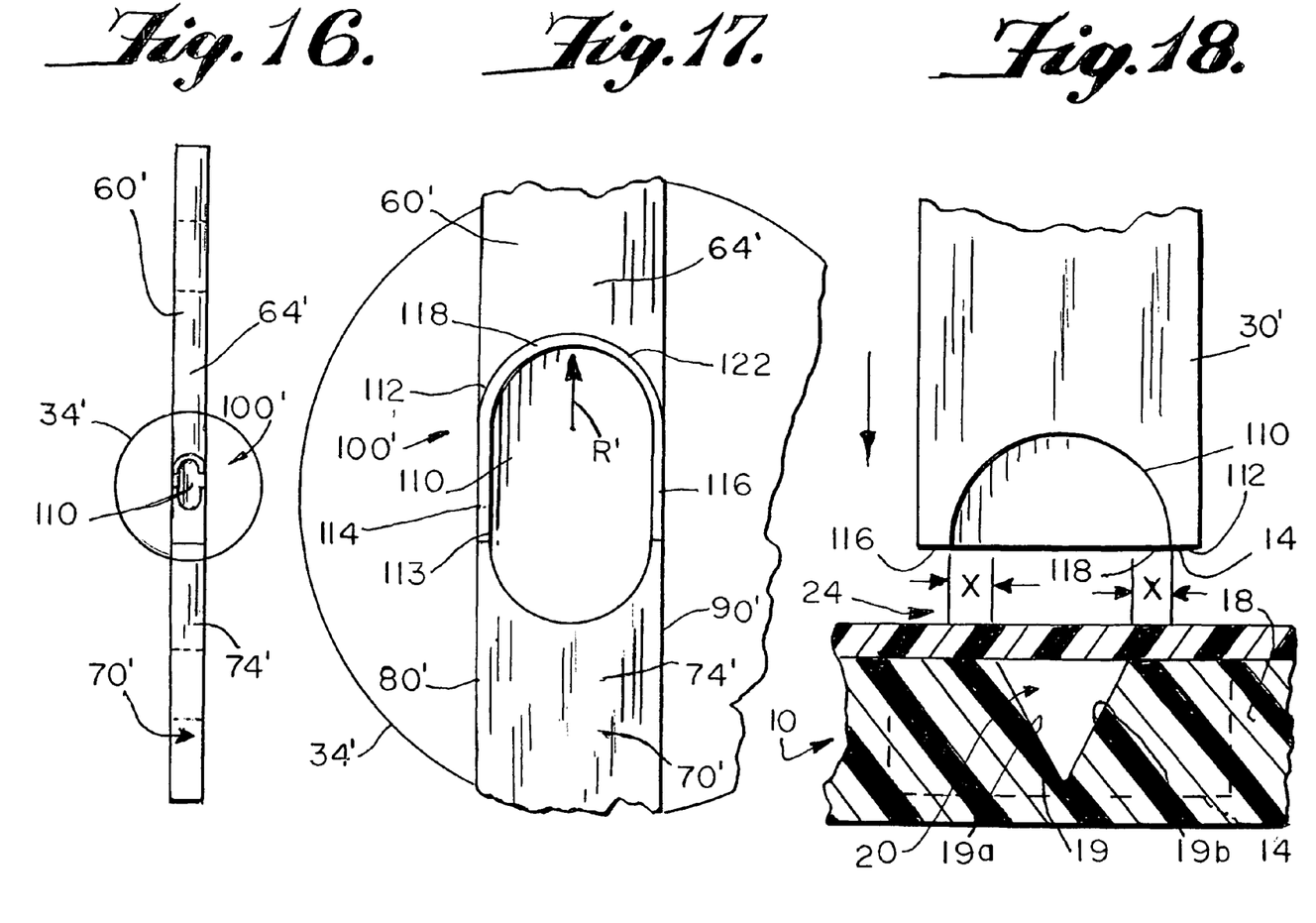
FIG. 16 is an end view of the closing blade shown in FIG. 13.
FIG. 17 is an enlarged view of the blade tip end portion of closing blade shown in FIG. 16.
FIG. 18 is a side view of a system according to various embodiments and incorporating the closing blade shown in FIGS. 13-17 positioned for a deforming operation on a microfluidic device.

FIG. 16 is an end view of the distal end 58' of closing blade 30' of FIG. 13. As shown, first side angled portion 64' and second side angled portion 74' can mutually converge to partially define a portion of the contact tip surface 100'.

FIG. 17 is an enlarged view of the blade tip portion 34' of closing blade 30' shown in FIG. 16. The perimeter of the rim 112 of the contact tip surface 100' can be defined at least by an end of the first side angled portion 64', an end of the second side angled portion 74', an end of the third side surface 80', an end of the fourth side surface 90', and by the recess 110. Along an inner periphery 113 of the rim 112, where the rim 112 intersects the recess 110, the recess 110 can possess a cross-sectional shape that includes at least one of a ⌐-shape, a U-shape, a V-shape, and an at least partially oval shape. At a closed end of the recess 110, the recess 110 can include a radius of curvature, R', of from about 0.010 inch to about 0.050 inch, or from about 0.015 inch to about 0.030 inch. Moreover, the rim 112 can include at least two spaced-apart contact tip surface portions 114, 116 that can be connected by an interconnecting rim portion 118 to form the substantially planar contact tip surface 100'.

According to various embodiments, the first side angled portion 64' can possess a curved surface along a length thereof. The curved surface can define a curved outer perimeter 122 of the interconnecting rim portion 118 at an intersection of an end of the first side angled portion 64' and the rim 112 of the contact tip surface 100'. By incorporating a curved outer perimeter 122 along the interconnecting rim portion 118, closing blade 30' can be forced into the microfluidic card 10 without cutting or ripping through the cover 20' along the interconnecting rim portion 118.

FIG. 18 shows a side view of an arrangement including a closing blade 30' that can be forced into contact with a microfluidic device 10' to deformably close an open channel 22. The closing blade 30' can be arranged such that when its contact tip surface 100' is forced into deformable contact the microfluidic device 10', each of the at least two spaced-apart contact tip surface portions 114, 116 of the rim 112 contact deformable material that has not previously been deformed during the formation of the channel 22. For example, the spaced-apart contact tip surface portions 114, 116 can strike the microfluidic device 10 a set distance, X, such as at least about 0.75 mm from a sidewall 19a, 19b of the channel 22. According to various embodiments, the distance, X, can vary proportionally as a function of the size of the sample wells and the size of the depression 19 formed in the intermediate wall. Moreover, the interconnecting rim portion 118 of the contact tip surface 100' can be forced into the microfluidic card 10 in an area that traverses across the width of the depression 19.

The contact tip surface 100' including the spaced-apart contact tip surface portions 114, 116 and the interconnecting rim portion 118, along with a portion of the surface of the recess 110, can cause the material defining the sidewalls 19a, 19b to be deformed. For example, the material defining the sidewalls 19a, 19b can be forced to bulge inwardly, to form a barrier wall between two sample wells 14. Moreover, the interconnecting rim portion 118 can simultaneously deform one or more respective portions of the sidewalls 19a, 19b to form part of the barrier wall.

As in the previously described embodiments, the barrier wall formed by closing blade 30' can to achieve a fluid-tight seal between the cover 20 and the barrier wall, thereby interrupting fluid communication between the sample wells 14. According to various embodiments, deformable material forming the barrier wall can be forced into contact with the partially deformed pressure sensitive adhesive layer to achieve the fluid-type seal.

As shown in FIG. 19, the microfluidic device 10 can be capable of being contacted and deformed by a deforming blade or a plurality of stacked deforming blades 30 attached to a movable support 32. According to various embodiments, a supporting device, such as, for example, a holder plate 34 can be used to securely support the microfluidic device 10 in relation to both the movable support 32 and the deforming blades 30 of the microfluidic assembly or system 38.

The plurality of blades can be spaced apart from one another by about 1.0 cm or less. The plurality of blades can be spaced apart from one another by about 0.5 cm or less. The plurality of blades can be spaced apart from one another by about 1.0 mm or less.

Various components, systems, and methods that can be used in conjunction with the closing blades, systems, and methods described herein, include the features and methods described in U.S. Provisional Patent Applications Nos. 60/398,777, 60/398,851, 60/399,548, and 60/398,946, and in U.S. patent applications Ser. Nos. 10/336,274, 10/336,706, and 10/336,330, all of which are herein incorporated in their entireties by reference.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A microfluidic manipulation system, comprising:
at least one movable support capable of being moved in at least a first direction and a second direction;
at least one blade, the at least one blade including a blade including a body defined by a support end and an opposing distal end, the support end being operatively connected to the at least one movable support;
a microfluidic device including at least one feature formed therein, the at least one feature being defined at least in part by a deformable material;
a holder for holding the microfluidic device;
wherein the distal end of the blade includes an end blade portion including at least a first side and a second side that converge to and terminate at a contact tip surface;
wherein the at least one movable support is adapted to position the distal end of the at least one blade relative to the microfluidic device when the microfluidic device is operatively held by the holder and is capable of moving the contact tip surface such that the contact tip surface contacts the microfluidic device to deform the deformable material and to at least partially close the at least one feature.

2. The microfluidic manipulation system of claim 1, wherein the at least one feature is at least one channel including at least one deformable sidewall.

3. The microfluidic manipulation system of claim 1, wherein the end blade portion further comprises a third side and a fourth side that converge to and terminate at the contact tip surface.

4. The microfluidic manipulation system of claim 3, wherein the contact tip surface includes a width that extends between the third side and the fourth side.

5. The microfluidic manipulation system of claim 1, wherein the contact tip surface includes a curved surface that is defined by a radius.

6. The microfluidic manipulation system of claim 5, wherein the contact tip surface includes an apex and possesses a linear contact surface at the apex.

7. The microfluidic manipulation system of claim 1, wherein the first side intersects the contact tip surface at a respective first rounded transition region and the second side intersects the contact tip surface at a respective second rounded transition region.

8. The microfluidic manipulation system of claim 7, wherein the contact tip surface includes a length that extends between the first and second rounded transition regions.

9. The microfluidic manipulation system of claim 1, wherein the at least one blade comprises a plurality of blades, each of the plurality of blades comprising a respective body defined by a respective support end and a respective opposing distal end, the respective support end of each of the plurality of blades being operatively connected to the at least one movable support, and each respective distal end of the plurality of blades includes an end blade portion including at least a first side and a second side that mutually converge to and terminate at a contact tip surface; and
the at least one movable support is adapted to position at least one of the plurality of blades relative to the microfluidic device when the microfluidic device is operatively held by the holder, and the at least one movable support is capable of moving the contact tip surface of at least one of the plurality of blades such that at least one respective contact tip surface contacts the microfluidic device to deform the deformable material and at least partially close the at least one feature.

10. The microfluidic manipulation system of claim 9, wherein the at least one movable support is capable of simultaneously moving the respective contact tip surfaces of the plurality of blades into contact with the at least one feature to simultaneously deform the deformable material and at least partially close the at least one feature.

11. The microfluidic manipulation system of claim 9, wherein the at least one movable support is capable of sequentially moving the respective contact tip surfaces of the plurality of blades into contact with the at least one feature to sequentially deform the deformable material and at least partially close the at least one feature.

12. The microfluidic manipulation system of claim 9, wherein the end blade portion of each of the plurality of blades further comprises a third side and a fourth side that mutually converge to and terminate at the contact tip surface.

13. A method of closing a feature formed in a microfluidic device, comprising:
providing the microfluidic manipulation system of claim 1; and
moving the support to force the distal end of the blade into contact with the microfluidic device to deform the deformable material forming the at least one feature and at least partially close the at least one feature.

14. A method of at least partially closing at least one feature formed in a microfluidic device, comprising:
providing the microfluidic manipulation system of claim 9;
forcing the distal end of at least one of the plurality of blades into contact with the microfluidic device to deform the deformable material and at least partially close the at least one feature; and
forcing the distal end of at least another one of the plurality of blades into contact with the microfluidic device to deform the deformable material and at least partially close the at least one feature.

15. The method of claim 14, wherein the plurality of blades are simultaneously forced into contact with the microfluidic device to simultaneously deform the deformable material and at least partially close the at least one feature.

16. The method of claim 14, wherein the plurality of blades are sequentially forced into contact with the microfluidic device to sequentially deform the deformable material and close the at least one feature.

17. A method of closing a channel formed in a microfluidic device, comprising:
providing at least one movable support capable of being moved in at least a first direction and a second direction;
providing a microfluidic device including at least one channel formed therein, wherein the at least one channel is at least partially defined by a deformable material;
providing at least one first blade including a body defined by a support end and an opposing distal end, the support end being operatively connected to the at least one movable support, the distal end terminating at a contact tip surface;
providing a holder for holding the microfluidic device; and
forcing the distal end of the at least one first blade into contact with the microfluidic device to deform the deformable material and at least partially close the at least one channel,
wherein the distal end of the blade includes an end blade portion including at least a first side and a second side that converge to and terminate at the contact tip surface, and the at least one movable support is adapted to position the distal end of the at least one blade relative to the microfluidic device when the microfluidic device is operatively held by the holder and is capable of moving the contact tip surface such that the contact tip surface contacts the micro fluidic device to deform the deformable material and to at least partially close the at least one feature.

18. The method of claim 17, whereby the contact tip surface of the at least one first blade includes at least two spaced-apart contact tip surface portions that contact the microfluidic device on opposing sides of the at least one channel when the distal end of the at least one first blade is forced into contact with the microfluidic device.

19. The method of claim 17, wherein the at least one blade comprises a plurality of blades, each blade of the plurality of blades including a body defined by a support end and an opposing distal end, each opposing distal end terminating at a respective contact tip surface; and
forcing the distal ends of the plurality of blades into contact with the microfluidic device to deform the deformable material and close the at least one channel.

20. The method of claim 19, wherein the microfluidic device includes a first area arranged on a first side of the at least one channel, and a second area arranged on an opposing second side of the at least one channel, and wherein at least one of the plurality of blades contacts one of the first and second areas and another one of the plurality of blades contacts the other of the first and second areas.

21. The method of claim 19, wherein the plurality of blades are simultaneously forced into contact with the microfluidic device to simultaneously deform portions of the deformable material and close the at least one channel.

22. The method of claim 19, wherein the plurality of blades are sequentially forced into contact with the micro fluidic device to sequentially deform respective portions of the deformable material and close the at least one channel.

23. The method of claim 17, wherein the at least one channel is defined by at least one respective sidewall, and the at least one first blade is forced into contact with the deformable material at a distance of at least about 0.75 mm from the at least one respective sidewall.

24. The method of claim 19, wherein the plurality of blades are spaced apart from one another about 1.0 cm or less.

25. The method of claim 19, wherein the plurality of blades are spaced apart from one another about 0.5 cm or less.

26. The method of claim 19, wherein the plurality of blades are spaced apart from one another about 1.0 mm or less.

* * * * *